United States Patent
Lee et al.

(10) Patent No.: US 10,752,709 B2
(45) Date of Patent: Aug. 25, 2020

(54) VINYL CHLORIDE-BASED POLYMER COMPOSITION AND METHOD FOR PRODUCING THE SAME

(71) Applicant: LG CHEM, LTD., Seoul (KR)

(72) Inventors: Jung Rae Lee, Daejeon (KR); Kyung Seog Youk, Daejeon (KR); Heung Kwon Bae, Daejeon (KR); Hyun Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 90 days.

(21) Appl. No.: 16/078,217

(22) PCT Filed: Oct. 12, 2017

(86) PCT No.: PCT/KR2017/011252
§ 371 (c)(1),
(2) Date: Aug. 21, 2018

(87) PCT Pub. No.: WO2018/070804
PCT Pub. Date: Apr. 19, 2018

(65) Prior Publication Data
US 2019/0055331 A1  Feb. 21, 2019

(30) Foreign Application Priority Data

Oct. 12, 2016  (KR) .......................... 10-2016-0131985

(51) Int. Cl.
| | | |
|---|---|---|
| C08F 14/06 | (2006.01) | |
| C08K 5/098 | (2006.01) | |
| C08K 5/12 | (2006.01) | |
| C08J 3/12 | (2006.01) | |
| C08K 5/11 | (2006.01) | |
| C08L 27/06 | (2006.01) | |
| C08F 214/06 | (2006.01) | |
| C08K 5/00 | (2006.01) | |

(52) U.S. Cl.
CPC ............ *C08F 14/06* (2013.01); *C08F 214/06* (2013.01); *C08J 3/12* (2013.01); *C08K 5/098* (2013.01); *C08K 5/11* (2013.01); *C08K 5/12* (2013.01); *C08L 27/06* (2013.01); *C08F 2400/00* (2013.01); *C08F 2800/20* (2013.01); *C08K 5/0016* (2013.01)

(58) Field of Classification Search
CPC .. C08F 14/06; C08F 2400/00; C08F 2800/20; C08K 5/098; C08K 5/12

USPC ......................................................... 524/297
See application file for complete search history.

(56) References Cited

U.S. PATENT DOCUMENTS

| | | | | |
|---|---|---|---|---|
| 2,133,666 A | * | 10/1938 | Mills ..................... | C11D 13/04 510/152 |
| 3,703,490 A | * | 11/1972 | Hersh ..................... | C08K 5/098 524/378 |
| 4,133,947 A | | 1/1979 | Kalka et al. | |
| 4,749,750 A | * | 6/1988 | Anzinger ............... | C08G 63/06 525/190 |
| 6,127,326 A | | 10/2000 | Dieckmann et al. | |
| 6,194,502 B1 | | 2/2001 | Dieckmann et al. | |
| 6,201,053 B1 | | 3/2001 | Dieckmann et al. | |
| 9,296,878 B2 | | 3/2016 | Uhr et al. | |
| 9,951,205 B2 | | 4/2018 | Uhr et al. | |
| 2014/0186564 A1 | | 7/2014 | Guesman et al. | |
| 2015/0051279 A1 | | 2/2015 | Uhr et al. | |
| 2015/0203660 A1 | | 7/2015 | Uhr et al. | |

FOREIGN PATENT DOCUMENTS

| | | | |
|---|---|---|---|
| CN | 102675995 A | | 9/2012 |
| CN | 102807644 A | | 12/2012 |
| EP | 2831161 B1 | | 11/2015 |
| GB | 1383100 A | | 2/1975 |
| JP | 07-010919 A | | 1/1995 |
| JP | 10-036407 A | | 2/1998 |
| JP | 2002-187989 A | | 7/2002 |
| JP | 2002187989 A | * | 7/2002 |
| KR | 10-2015-0001763 A | | 1/2015 |
| KR | 10-2015-0096493 A | | 8/2015 |
| WO | 0006676 A1 | | 2/2000 |

OTHER PUBLICATIONS

Translation of JP 2002-187989 (Application 2000-386823), Jul. 5, 2002. (Year: 2002).*

* cited by examiner

*Primary Examiner* — Hui H Chin
(74) *Attorney, Agent, or Firm* — Dentons US LLP

(57) ABSTRACT

The present invention relates to a vinyl chloride-based polymer composition and a method for producing the same, and more particularly, to a vinyl chloride-based polymer composition including a vinyl chloride-based polymer and a plasticizer, wherein the vinyl chloride-based polymer includes a higher fatty acid having 10 to 18 carbon atoms in an amount of more than 0.05 parts by weight to less than 2.0 parts by weight, based on 100 parts by weight of the vinyl chloride-based polymer.

12 Claims, No Drawings

VINYL CHLORIDE-BASED POLYMER COMPOSITION AND METHOD FOR PRODUCING THE SAME

TECHNICAL FIELD

Cross-Reference to Related Applications

This application is a National Stage Entry of International Application No. PCT/KR2017/011252 filed on Oct. 12, 2017, and claims the benefit of Korean Application No. 10-2016-0131985, filed on Oct. 12, 2016, all of which are hereby incorporated by reference in their entirety for all purposes as if fully set forth herein.

TECHNICAL FIELD

The present invention relates to a vinyl chloride-based polymer composition, and more particularly, a vinyl chloride-based polymer composition excellent in flowability and thixotropy.

BACKGROUND ART

A vinyl chloride-based polymer is a polymer including 50 wt % or more of a repeat unit derived from a vinyl chloride monomer (VCM), which is low in cost, easy to control hardness, and applicable to most processing apparatuses, so that the application fields are diverse. In addition, the vinyl chloride-based polymer may provide a molded body excellent in physical and chemical properties such as mechanical strength, weather resistance, chemical resistance and the like, and thus is widely used in various fields.

Such a vinyl chloride-based polymer is produced in a different form depending on the use. For example, a vinyl chloride-based polymer for straight processing such as an extrusion process, a calendering process, and an injection process is generally produced by suspension polymerization, and a vinyl chloride-based polymer for paste processing such as dipping, spraying and coating is produced by emulsion polymerization.

In the paste processing, a vinyl chloride-based polymer latex for paste processing obtained by emulsion polymerization is generally dried by spray-drying to form final resin particles. The particles are dispersed in a solvent or a plasticizer and then subjected to a process such as coating (reverse roll-coating, knife coating, screen coating, spray coating), gravure and screen printing, rotation casting, and shell casting and dipping, and thus applied to products such as flooring, wallpaper, tarpaulin, rainwear, glove, automobile underbody coating, sealant and carpet tile.

This vinyl chloride-based polymer for paste processing alone is difficult to apply because of low processability and is usually used by being processed into a plastisol form which is composed of various additives such as a heat stabilizer together with the plasticizer. In this case, it is important that the viscosity of the plastisol is adjusted to an appropriate level to maintain good flowability.

Meanwhile, prior to the improvement of flowability, when an external force (shear rate) is not applied, the plastisol maintains a gel state in which the plastisol does not flow, and as the external force (shear rate) is applied, the plastisol is changed into a flowable plastisol. The higher a Bingham yield stress value to be appeared in this case, the more clearly the gel state in which the plastisol does not flow when no external force is applied is exhibited. In addition, in the case of the flowable plastisol of which viscosity is lowered due to applying the external force, when the external force (shear rate) is removed again, the plastisol is restored to the original gel state. As the Bingham yield stress value in this case becomes the same as a Bingham yield stress value in the case of applying the external force, gel properties are similar to those of the original plastisol. When such thixotropy is poor, there is a problem that the processability and productivity are deteriorated resulting from the viscosity change of the plastisol during processing of the plastisol. Also, when the external force is increased or decreased, in the case of the Bingham yield stress being very high, the viscosity is very high during solation of the gel and thus the flowability is not good, and in the case of the Bingham yield stress being very low, there is a problem that the gel state holding ability of the plastisol is lowered and the processability is deteriorated.

In order to solve the above problem, there has been proposed a method of adding an additive such as an inorganic material in the production of a plastisol, but the method has a problem of deteriorating the mechanical properties of a molded article. Accordingly, there is a continuing need for the development of a vinyl chloride-based polymer composition excellent in thixotropy while preventing the mechanical properties of the molded article from deteriorating.

PRIOR ART DOCUMENT

Patent Document (Patent Document 1) JP1998-036407 A

DISCLOSURE OF THE INVENTION

Technical Problem

An aspect of the present invention provides a vinyl chloride-based polymer composition for maintaining an appropriate viscosity while preventing deterioration of mechanical properties of polymer resulting from an additive such as an inorganic material, and for producing a plastisol excellent in thixotropy, and a method for producing a vinyl chloride-based polymer composition.

Technical Solution

According to an aspect of the present invention, there is provided a vinyl chloride-based polymer composition including: a vinyl chloride-based polymer; and a plasticizer, wherein the vinyl chloride-based polymer includes a higher fatty acid having 10 to 18 carbon atoms in an amount of more than 0.05 parts by weight to less than 2.0 parts by weight, based on 100 parts by weight of the vinyl chloride-based polymer; a Bingham yield stress of an external force increasing condition is more than 111 Pa to less than 385 Pa; a Bingham yield stress under an external force decreasing condition is more than 97 Pa to less than 362 Pa; and a difference in Bingham yield stress value between the external force increasing condition and the external force decreasing condition is more than 0 Pa to 35 Pa or less.

In addition, the present invention provides a method for producing a vinyl chloride-based polymer composition, the method comprising the steps of: (S1) producing a vinyl chloride-based polymer latex including a vinyl chloride-based polymer; (S2) adding a higher fatty acid having 10 to 18 carbon atoms to the produced vinyl chloride-based polymer latex and stirring the mixture; (S3) drying the stirred vinyl chloride-based polymer latex to obtain a vinyl chloride-based polymer powder; and (S4) stirring the vinyl chloride-based polymer powder with a plasticizer to produce the vinyl chloride-based polymer composition, wherein the higher fatty acid is added in an amount of more than 0.05 parts by weight to less than 2.0 parts by weight, based on 100 parts by weight (based on solid content) of the vinyl chloride-based polymer; the vinyl chloride-based polymer composition produced in the step (S4) has a Bingham yield stress of more than 111 Pa to less than 385 Pa under an external force increasing condition and a Bingham yield stress of 97 Pa to less than 362 Pa under an external force decreasing condition; and a difference in Bingham yield stress value between the external force increasing condition and the external force decreasing condition is more than 0 Pa to 35 Pa or less.

Advantageous Effects

According to the present invention, an additive for improving thixotropy is included in a vinyl chloride-based polymer, so that there is an effect of providing a vinyl chloride-based polymer composition excellent in thixotropy while maintaining an appropriate viscosity without addition of an additive such as a separate inorganic material in the production of a plastisol, and a method for producing a vinyl chloride-based polymer composition.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A vinyl chloride-based polymer composition according to the present invention may include a vinyl chloride-based polymer and a plasticizer, wherein the vinyl chloride-based polymer may include a higher fatty acid having 10 to 18 carbon atoms in an amount of more than 0.05 parts by weight and less than 2.0 parts by weight, based on 100 parts by weight of the vinyl chloride-based polymer, a Bingham yield stress under an external force increasing condition may be more than 111 Pa and less than 385 Pa, a Bingham yield stress under an external force decreasing condition may be more than 97 Pa and less than 362 Pa, and a difference in Bingham yield stress value between the external force increasing condition and the external force decreasing condition may be more than 0 Pa and 35 Pa or less.

The vinyl chloride-based polymer according to the present invention may include 50 to 100 wt % of a repeat unit derived from a vinyl chloride monomer and 0 to 50 wt % of a repeat unit derived from a vinyl-based monomer. The repeat unit derived from the vinyl chloride monomer may mean a repeat unit formed through a polymerization reaction of a vinyl chloride monomer (VCM), and the repeat unit derived from the vinyl-based monomer may be a repeat unit in which a vinyl-based monomer copolymerizable with the vinyl chloride monomer is formed through a polymerization reaction with the vinyl chloride monomer. Examples of the vinyl-based monomer may include at least one selected from the group consisting of olefin compounds such as ethylene and propylene; vinyl esters such as vinyl acetate and vinyl propionate; unsaturated nitriles such as acrylonitrile; vinyl alkyl ethers such as vinyl methyl ether and vinyl ethyl ether; unsaturated fatty acids such as acrylic acid, methacrylic acid, itaconic acid and maleic acid; and a hydrides of these fatty acids.

According to an embodiment of the present invention, the higher fatty acid included in the vinyl chloride-based polymer may include in a mixed state on a three-dimensional network of the vinyl chloride-based polymer. That is, the higher fatty acid may be present in a mixed state on the three dimensional network in which the main chain of the vinyl chloride-based polymer is entangled with each other.

An example of the higher fatty acid according to the present invention may include at least one functional group or bond selected from the group consisting of at least one hydroxyl group, at least one unsaturated bond, and at least two carboxyl groups. As a specific example, the higher fatty acid may be a higher fatty acid having 10 to 18 carbon atoms including one hydroxyl group, a higher fatty acid having 10 to 18 carbon atoms including one unsaturated bond, a higher fatty acid having 10 to 18 carbon atoms including one hydroxyl group and one unsaturated bond, a higher fatty acid having 10 to 18 carbon atoms including two unsaturated bonds, a higher fatty acid having 10 to 18 carbon atoms including carboxyl groups at both ends of the carbon chain, and the like. Herein, the unsaturated bond may mean a double bond or a triple bond between carbon and carbon.

The higher fatty acid according to an embodiment of the present invention may include at least one functional group or bond selected from the group consisting of castor oil fatty acid, dehydrated castor oil fatty acid, hardened castor oil fatty acid, sebacic acid, and undecylenic acid. In this case, there is an effect that the thixotropy of the plastisol is excellent, and the processability and productivity are excellent.

The higher fatty acid according to an embodiment of the present invention may be a saponified higher fatty acid. The saponified higher fatty acid may be a higher fatty acid in which a higher fatty acid is saponified with a saponifying agent. The saponifying agent may be, for example, alkali hydroxide.

For example, the higher fatty acid may be included in an amount of more than 0.05 and less than 2.0 parts by weight, 0.1 to 1.5 parts by weight, 0.1 to 1.0 parts by weight, or 0.3 to 0.7 parts by weight, based on 100 pacts by eight of the vinyl chloride-based polymer, and there is an effect of excellent thixotropy thin this range.

The plasticizer may be an organic additive material in which the plastisol together is formed together with the vin 1 chloride-based polymer to increase the thermoplasticity of the polymer, thereby improving the moldability of the vinyl chloride-based polymer. As a specific example, the plasticizer may be at least one selected from the group consisting of a phosphate ester-based plasticizer, an aliphatic dibasic acid ester-based plasticizer, an epoxy-based plasticizer and polyester-based plasticizer. More specifically, examples of the plasticizer may include phthalate ester-based plasticizer such as dibutyl phthalate (DBP), di-2-ethylhexyl phthalate (DOP) and diisodecyl phthalate (DIDP), a trimellitic acid ester-based plasticizer such as trioctyl trimellitate (TOTM) and tridecyl trimellitate, a phosphate ester-based plasticizer such as tricresyl phosphate and trioctyl phosphate, an aliphatic dibasic acid ester-based plasticizer such as a octyl adipate and diisodecyl adipate, an epoxy-based plasticizer, and a polyester-based plasticizer.

According to an embodiment of the present invention, the plasticizer may be included in an amount of 1 to 200 parts by weight, 50 to 150 parts by weight, or 100 to 150 parts by weight, based on 100 parts by weight of the vinyl chloride-based polymer, and there is an effect of excellent processability and productivity within this range.

According to an embodiment of the present invention, when a shear rate is increased from 10/s to 500/s for 180 seconds, the vinyl chloride-based polymer composition may have a Bingham yield stress of more than 111 Pa and less than 385 Pa, 120 Pa to 380 Pa, or 124 Pa to 376 Pa; when the shear rate is decreased from 500/s to 10/s for 180 seconds, the Bingham yield stress may be more than 97 Pa and less than 362 Pa, 100 Pa to 360 Pa, or 110 Pa to 350 Pa, and there is an effect of excellent thixotropy within this range.

As another example, the vinyl chloride-based polymer composition may have a difference in Bingham yield stress value between an external force increasing condition and an external force decreasing condition of more than 0 Pa and 35 Pa or less, 5 Pa to 35 Pa, or 9 Pa to 32 Pa, and there is an effect of excellent thixotropy within this range.

According to an embodiment of the present invention, the vinyl chloride-based polymer composition, when the shear rate is increased from 10/s to 500/s for 180 seconds, the vinyl chloride-based polymer composition may have a Bingham viscosity of more than 0.841 Pa·s and less than 1.362 Pa·s, 0.850 Pa·s to 1.350 Pa·s, or 0.884 Pa·s to 1.321 Pa·s; when the shear rate is decreased from 500/s to 10/s for 180 seconds, the Bingham viscosity may be more than 0.837 Pa·s and less than 1.302 Pa·s, 0.850 Pa·s to 1.290 Pa·s, or 0.852 Pa·s to 1.278 Pa·s, and there is an effect of excellent processability and thixotropy within this range.

As another example, the vinyl chloride-based polymer composition may have a difference in Bingham viscosity value between the external force increasing condition and the external force decreasing condition of more than 0 Pa·s and less than 0.07 Pa·s, 0.001 Pa·s to 0.065 Pa·s, or 0.019 Pa·s to 0.065 Pa·s, and there is an effect of excellent thixotropy within this range.

The vinyl chloride-based polymer composition may be, for example, a plastisol. The plastisol may be a mixture of the vinyl chloride-based polymer and the plasticizer such that the plastisol may be processed into a molded, casted, or continuously filmed form by heat, and another example may be a paste form.

A method for producing a vinyl chloride-based polymer composition according to the present invention may include the steps of: (S1) producing a vinyl chloride-based polymer latex including a vinyl chloride-based polymer; (S2) adding a higher fatty acid having 10 to 18 carbon atoms to the produced vinyl chloride-based polymer latex and stirring the mixture; (S3) drying the stirred vinyl chloride-based polymer latex to obtain a vinyl chloride-based polymer powder; and (S4) stirring the vinyl chloride-based polymer powder with a plasticizer to produce a vinyl chloride-based polymer composition, wherein the higher fatty acid may be added in an amount of more than 0.05 parts by weight and less than 1.0 parts by weight, based on 100 parts by weight (based on solid content) of the vinyl chloride-based polymer, and the higher fatty acid may be added in an amount of more than 0.05 parts by weight and less than 2.0 parts by weight, based on 100 parts by weight (based on solid content) of the vinyl chloride-based polymer, wherein the vinyl chloride-based polymer composition produced in the step (S4) may have Bingham yield stress of more than 111 Pa and less than 385 Pa under an external force increasing condition and Bingham yield stress of 97 Pa and less than 362 Pa under an external force decreasing condition, and a difference in Bingham yield stress value between the external force increasing condition and the external force decreasing condition may be more than 0 Pa and 35 Pa or less. According to the above-described production method of the present invention, there may be produced a vinyl chloride-based polymer composition which includes a vinyl chloride-based polymer including a higher fatty acid having 10 to 18 carbon atoms and a plasticizer, and has excellent thixotropy.

The vinyl chloride-based polymer composition latex in the step (S1) may be produced by an emulsion polymerization method, a micro-suspension polymerization method, a suspension polymerization method or a bulk polymerization method. However, when the vinyl chloride-based polymer is produced by the emulsion polymerization method or the micro-suspension polymerization method, a large amount of plastisol is used in the processing and thus may be more effective of the improvement of thixotropic properties. Therefore, the vinyl chloride-based polymer composition latex may be preferably produced by the emulsion polymerization method or the micro-suspension polymerization method.

For example, the emulsion polymerization may be carried out by adding polymerized water, a first emulsifier, a water-soluble initiator and the like into a high-pressure reactor and then reacting the vinyl chloride monomer or the like added into a reactor in a vacuum state, and a second emulsifier may be added separately from the first emulsifier during polymerization, and the second emulsifier may be continuously added during polymerization.

As another example, before the vacuum is applied to the high-pressure reactor, additives such as a dispersant, a reaction inhibitor, an electrolyte, and a molecular weight regulator may be added in addition to the first emulsifier as needed. In this case, based on 100 parts by weight of the vinyl chloride monomer, the first emulsifier may be used in an amount of 0.02 to 0.4 parts by weight, the water-soluble polymerization initiator in an amount of 0.01 to 2 parts by weight, the second emulsifier in an amount of 0.01 to 6 parts by weight, the electrolyte in an amount of 0.0001 to 3 parts by weight, and the molecular weight regulator in an amount of 0.01 to 2 parts by weight.

The first emulsifier and the second emulsifier may be the same or different. As specific examples, the first emulsifier and the second emulsifier may be at least one selected from the group consisting of sodium lauryl sulfate, lauryl benzene sulfonate, alpha-olefin sulfonate, sodium lauryl ethoxylated sulfate, sodium octadecyl sulfate, sodium lauryl ether sulfate and linear alkyl benzene sulfonate, and the water-soluble polymerization initiator may be at least one selected from the group consisting of kalium persulfate, ammonium persulfate, and hydrogen peroxide. The molecular weight regulator may be, for example, n-butylmercaptan, n-octylmercaptan, n-dodecylmercaptan, t-dodecylmercaptan, and the like. The electrolyte may be, for example, at least one selected from the group consisting of potassium chloride, sodium chloride, potassium bicarbonate, sodium carbonate, potassium carbonate, potassium hydrogen sulfite, sodium hydrogen sulfite, sodium pyrophosphate, sodium pyrosine phosphate, tripotassium phosphate, trisodium phosphate, dipotassium hydrogenphosphate and disodium hydrogenphosphate. The emulsion polymerization may be carried out, for example, within a temperature range of 30° C. to 70° C.

Meanwhile, the method for producing a vinyl chloride-based polymer composition according to the present invention may further include the step of saponifying a higher fatty acid with a saponifying agent before the addition of the higher fatty acid in the step (S2). In this case, there is an effect that the higher fatty acid is uniformly distributed in the polymer. The saponifying agent may be, for example, an alkali hydroxide, and specific examples thereof may include sodium hydroxide or potassium hydroxide. As another example, the saponifying agent may be used at a molar ratio of 0.1 mol to 5 mol, 0.5 mol to 3 mol, 0.8 mol to 2.5 mol, or 1 mol to 1.5 mol relative to 1 mol of the higher fatty acid.

The method for producing a vinyl chloride-based polymer may further include, for example, the steps of dehydrating and washing before drying after stirring in the step (S3).

EXAMPLE

Example 1

The reactor was vacuumed to −730 mmHg while stirring 100 parts by weight of polymerization water, 0.01 part by weight of sodium lauryl sulfate as a first emulsifier, and 0.06 part by weight of kalium persulfate (KPS) added to a 500 L high-pressure reactor, and 100 parts by weight of vinyl chloride monomer (VCM) was added to a reactor in a vacuum state, and then the temperature of the reactor was raised to 50° C. to perform polymerization. After the initiation of the polymerization reaction, 1 part by weight of sodium lauryl sulfate as a second emulsifier was continuously added into the reactor for 8 hours, and the saponified castor oil fatty acid was added in an amount of 0.5 part by weight based on 100 parts by weight (based on solid content) of the vinyl polymer to the vinyl chloride-based polymer latex at the time point of the polymerization conversion rate of 80% to 85%, and the mixture was stirred for 30 minutes to produce an emulsion-polymerized vinyl chloride-based polymer latex. Then, the produced vinyl chloride-based polymer latex was spray-dried to produce a powdery vinyl chloride-based polymer.

Next, 120 parts by weight of dioctyl phthalate (DOP) as a plasticizer was mixed with 100 parts by weight of the obtained powdery vinyl chloride-based polymer to produce the vinyl chloride-based polymer composition, and then the mixture was stirred at 800 rpm for 10 minutes by using a EUROSTAR's WERKE mixer to produce a plastisol.

Example 2

Example 2 was carried out in the same manner as Example 1, except that the saponified dehydrate castor oil fatty acid was added in the same amount instead of the saponified castor oil fatty acid in Example 1.

Example 3

Example 3 was carried out in the same manner as Example 1, except that the saponified hardened castor oil fatty acid was added in the same amount instead of the saponified castor oil fatty acid in Example 1.

Example 4

Example 4 was carried out in the same manner as Example 1, except that the saponified sebacic acid was added in the same amount instead of the saponified castor oil fatty acid in Example 1.

Example 5

Example 4 was carried out in the same manner as Example 1, except that the saponified undecylenic acid was added in the same amount instead of the saponified castor oil fatty acid in Example 1.

Example 6

In a 1 L reactor, 2.7 parts by weight of di-2-ethylhexyl peroxydicarbonate as an oil-soluble initiator and 100 parts by weight of a vinyl chloride monomer (VCM) were added to a mixture made by mixing 0.68 parts by weight of sodium lauryl sulfate as an emulsifier and 1.36 parts by weight of fatty acid alcohol with 59 parts by weight of dehydrate water, and were stirred and mixed. Then, a homogenizer was operated by being distributed at a total pressure of 1,400 psi at a ratio of 50:50 at the front end and the rear end, respectively. The reactant was transported to a 1 m³ reactor, and then the temperature inside the reactor was adjusted to 45° C. to perform the polymerization reaction. The saponified castor oil fatty acid was added in an amount of 0.5 parts by weight based on 100 parts by weight (based on solid content) of the vinyl chloride-based polymer to the vinyl chloride-based polymer latex at the time point of a polymerization conversion rate of 80% to 85%. Then, the produced vinyl chloride-based polymer latex was spray-dried to produce a powdery vinyl chloride-based polymer.

Next, 120 parts by weight of dioctyl phthalate (DOP) as a plasticizer was mixed with 100 parts by weight of the obtained powdery vinyl chloride-based polymer to produce a vinyl chloride-based polymer composition, and then the mixture was stirred at 800 rpm for 10 minutes by using a EUROSTAR's WERKE mixer to produce a plastisol.

Example 7

Example 7 was carried out in the same manner as Example 6, except that the saponified dehydrate castor oil fatty acid was added in the same amount instead of the saponified castor oil fatty acid in Example 6.

Example 8

Example 8 was carried out in the same manner as Example 6, except that the saponified hardened castor oil fatty acid was added in the same amount instead of the saponified castor oil fatty acid in Example 6.

Example 9

Example 9 was carried out in the same manner as Example 6, except that the saponified sebacic acid was added in the same amount instead of the saponified castor oil fatty acid in Example 6.

Example 10

Example 10 was carried out in the same manner as Example 6, except that the saponified undecylenic acid was added in the same amount instead of the saponified castor oil fatty acid in Example 6.

Comparative Example 1

Comparative Example 1 was carried out in the same manner as Example 1, except that the vinyl chloride-based polymer latex was spray-dried to produce a powdery vinyl chloride-based polymer without adding the saponified castor oil fatty acid to the vinyl chloride-based polymer latex in Example 1.

Comparative Example 2

Comparative Example 2 was carried out in the same manner as Example 1, except that the vinyl chloride-based polymer latex was spray-dried to produce a powdery vinyl chloride-based polymer without adding the saponified castor oil fatty acid to the vinyl chloride-based polymer latex in Example 6.

Comparative Example 3

Comparative Example 3 was carried out in the same manner as Example 1, except that the saponified castor oil fatty acid was added in an amount of 0.05 parts by weight to the vinyl chloride-based polymer latex in Example 1.

Comparative Example 4

Comparative Example 4 was carried out in the same manner as Example 1, except that the saponified castor oil fatty acid was added in an amount of 1.0 part by weight to the vinyl chloride-based polymer latex in Example 1.

Experimental Example

The plastisol prepared in Examples and Comparative Examples was measured by using a Rotational Rheometer AR2000EX manufactured by TA Instrument under the conditions of a Peltier plate 40 mm and a gap size 0.5 mm, as follows: 1) the Bingham yield stress (Pa) of the plastisol was measured after the external force was increased at a shear rate of from 10/s to 500/s over time for 180 seconds under the external force increasing condition; 2) the Bingham yield stress (Pa) of the plastisol was measured after the external force was decreased at a shear stress of from 500/s to 10/s for 180 seconds under the external force decreasing condition. The Bingham viscosity (Pa·s) was measured under the external force increasing condition and the external force decreasing condition and was shown in Table 1 below.

TABLE 1

| Classification | | Polymerization method | Higher fatty acid type | Addition amount (parts by weight) | External force increasing condition | | External force decreasing condition | |
|---|---|---|---|---|---|---|---|---|
| | | | | | Bingham yield stress | Bingham viscosity | Bingham yield stress | Bingham viscosity |
| Example | 1 | Pure emulsion polymerization | Castor oil fatty acid | 0.5 | 376 | 1.321 | 347 | 1.278 |
| | 2 | | Dehydrated castor oil fatty acid | | 357 | 1.289 | 346 | 1.229 |
| | 3 | | Hardened castor oil fatty acid | | 352 | 1.277 | 335 | 1.223 |
| | 4 | | Sebacic acid | | 243 | 1.156 | 211 | 1.107 |
| | 5 | | Undecylenic acid | | 214 | 1.098 | 183 | 1.079 |
| | 6 | Micro-suspension polymerization | Castor oil fatty acid | | 167 | 1.012 | 147 | 0.947 |
| | 7 | | Dehydrated castor oil fatty acid | | 154 | 0.976 | 142 | 0.931 |
| | 8 | | Hardened castor oil fatty acid | | 161 | 0.994 | 145 | 0.938 |
| | 9 | | Sebacic acid | | 130 | 0.905 | 119 | 0.863 |
| | 10 | | Undecylenic acid | | 124 | 0.884 | 115 | 0.852 |
| Comparative Example | 1 | Pure emulsion polymerization | — | — | 86 | 0.816 | 49 | 0.739 |
| | 2 | Micro-suspension polymerization | — | — | 53 | 0.761 | 31 | 0.722 |
| | 3 | Pure emulsion polymerization | Castor oil fatty acid | 0.05 | 111 | 0.841 | 97 | 0.837 |
| | 4 | | Castor oil fatty acid | 2.0 | 385 | 1.362 | 362 | 1.302 |

As shown in Table 1, in the case of the vinyl chloride-based polymer composition produced according to the present invention, it was ascertained that an appropriate level of the Bingham yield stress and the Bingham viscosity were exhibited, and thus flowability and workability were excellent and thixotropy also was excellent.

On the other hand, in the case of Comparative Examples 1 and 2 which did not include a fatty acid in the vinyl chloride-based polymer, it was ascertained that the Bingham yield stress and the Bingham viscosity were extremely low regardless of the polymerization method, and even in the case of Comparative Example 3 including the fatty acid in a very small amount of the vinyl chloride-based polymer, it was also ascertained that the Bingham yield stress and the Bingham viscosity were below an appropriate level for processing. Further, in the case of Comparative Example 4 including an excessive amount of fatty acid, it was ascertained that the Bingham yield stress and the Bingham viscosity were all very high, which means that the flowability was not good and thus the workability was deteriorated.

As described above, according to the present invention, there is an effect in that a vinyl chloride-based polymer composition excellent in thixotropy may be produced while maintaining an appropriate viscosity without adding an additive such as an inorganic material when producing a plastisol.

The invention claimed is:

1. A vinyl chloride-based polymer composition comprising:
a vinyl chloride-based polymer; and a plasticizer,
wherein the vinyl chloride-based polymer includes a higher fatty acid in an amount of more than 0.05 parts by weight and less than 2.0 parts by weight, based on 100 parts by weight of the vinyl chloride-based polymer,
wherein the higher fatty acid is at least one selected from the group consisting of castor oil fatty acid, dehydrated castor oil fatty acid, sebacic acid, and undecylenic acid,
a Bingham yield stress of the vinyl chloride-based polymer composition under an external force increasing condition is more than 111 Pa and less than 385 Pa; a Bingham yield stress of the vinyl chloride-based polymer composition under an external force decreasing condition is more than 97 Pa and less than 362 Pa; and a difference in Bingham yield stress value between the external force increasing condition and the external force decreasing condition is more than 0 Pa and 35 Pa or less,
wherein the external force increasing condition is a condition in which an external force increases when a shear rate is increased from 10/s to 500/s for 180 seconds, and
wherein the external force decreasing condition is a condition in which an external force decreases when a shear rate is decreased from 500/s to 10/s for 180 seconds.

2. The vinyl chloride-based polymer composition of claim 1, wherein the vinyl chloride-based polymer comprises 50 to 100 wt% of a repeat unit derived from a vinyl chloride monomer and 0 to 50 wt% of a repeat unit derived from a vinyl-based monomer.

3. The vinyl chloride-based polymer composition of claim 1, wherein the higher fatty acid is included in a mixed state on a three-dimensional network of the vinyl chloride-based polymer.

4. The vinyl chloride-based polymer composition of claim 1, wherein the higher fatty acid is a saponified higher fatty acid.

5. The vinyl chloride-based polymer composition of claim 1, wherein the plasticizer is at least one selected from the group consisting of a phosphate ester-based plasticizer, an aliphatic dibasic acid ester-based plasticizer, an epoxy-based plasticizer and a polyester-based plasticizer.

6. The vinyl chloride-based polymer composition of claim 1, wherein the plasticizer is included in an amount of 1 to 200 parts by weight, based on 100 parts by weight of the vinyl chloride-based polymer.

7. The vinyl chloride-based polymer composition of claim 1, wherein when the shear rate is increased from 10/s to 500/s for 180 seconds, a Bingham viscosity is more than 0.841 Pa·s and less than 1.362 Pa·s.

8. The vinyl chloride-based polymer composition of claim 1, wherein when the shear rate is decreased from 500/s to 10/s for 180 seconds, a Bingham viscosity is more than 0.837 Pa·s and less than 1.302 Pa·s.

9. A method for producing a vinyl chloride-based polymer composition, the method comprising the steps of:
(S1) producing a vinyl chloride-based polymer latex including a vinyl chloride-based polymer;
(S2) adding a higher fatty acid to the produced vinyl chloride-based polymer latex and stirring the mixture;
(S3) drying the stirred vinyl chloride-based polymer latex to obtain a vinyl chloride-based polymer powder; and
(S4) stirring the vinyl chloride-based polymer powder with a plasticizer to produce the vinyl chloride-based polymer composition,
wherein the higher fatty acid is at least one selected from the group consisting of castor oil fatty acid, dehydrated castor oil fatty acid, sebacic acid, and undecylenic acid,
wherein the higher fatty acid is added in an amount of more than 0.05 parts by weight to less than 2.0 parts by weight, based on 100 parts by weight (based on solid content) of the vinyl chloride-based polymer;
the vinyl chloride-based polymer composition produced in the step (S4) has Bingham yield stress of more than 111 Pa and less than 385 Pa under an external force increasing condition and Bingham yield stress of 97 Pa and less than 362 Pa under an external force decreasing condition; and a difference in Bingham yield stress value between the external force increasing condition and the external force decreasing condition is more than 0 Pa and 35 Pa or less,
wherein the external force increasing condition is a condition in which an external force increases when a shear rate is increased from 10/s to 500/s for 180 seconds, and
wherein the external force decreasing condition is a condition in which an external force decreases when a shear rate is decreased from 500/s to 10/s for 180 seconds.

10. The method of claim 9, wherein the vinyl chloride-based polymer latex in the step (S1) is produced by an emulsion polymerization method or a micro-suspension polymerization method.

11. The method of claim 9, further comprising the step of saponifying the higher fatty acid with a saponifying agent before the addition of the higher fatty acid in the step (S2).

12. The method of claim 11, wherein the saponifying agent is used in a molar ratio of 0.1 to 5 mol relative to 1 mol of the higher fatty acid.

* * * * *